United States Patent Office 3,053,012
Patented Sept. 11, 1962

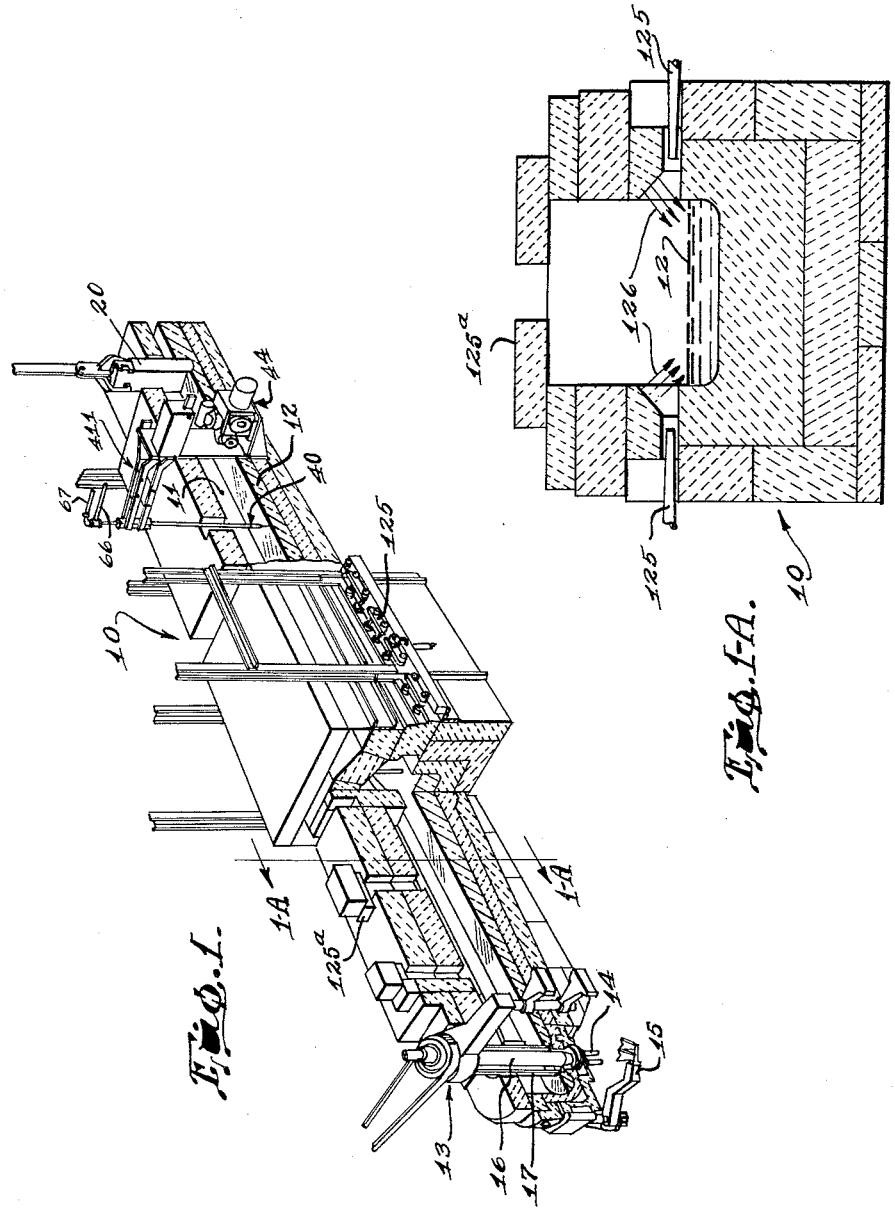

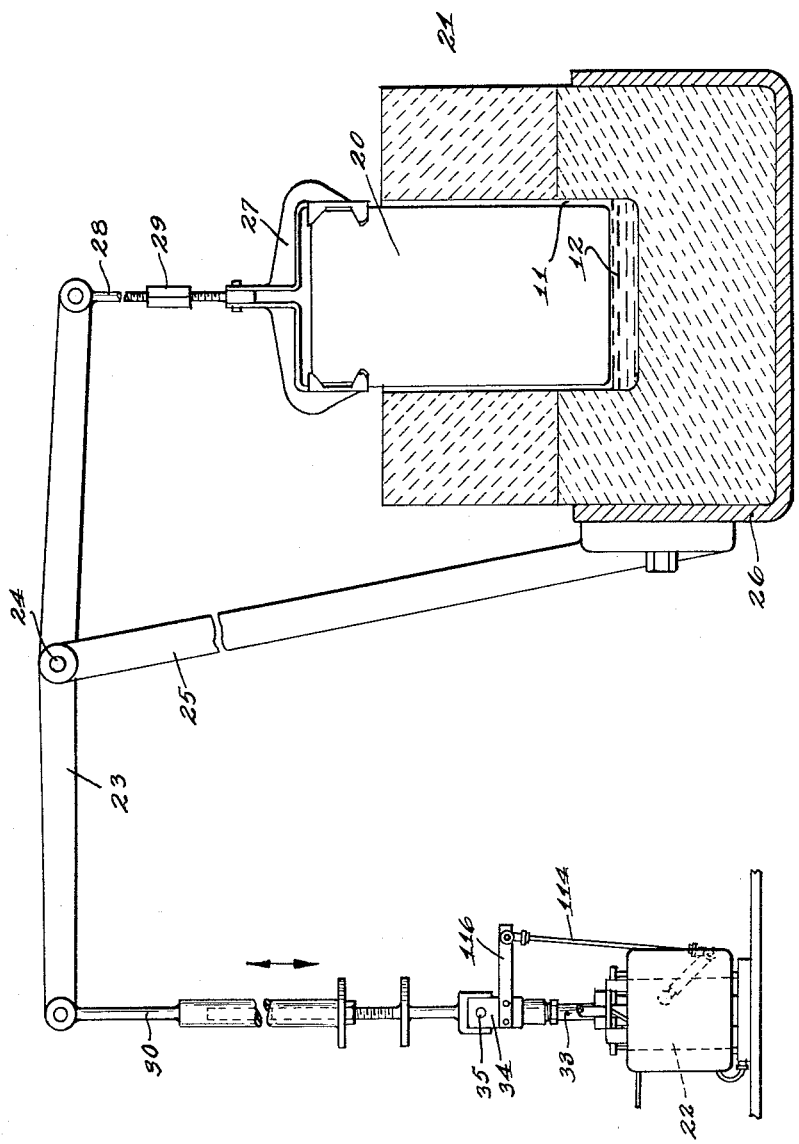

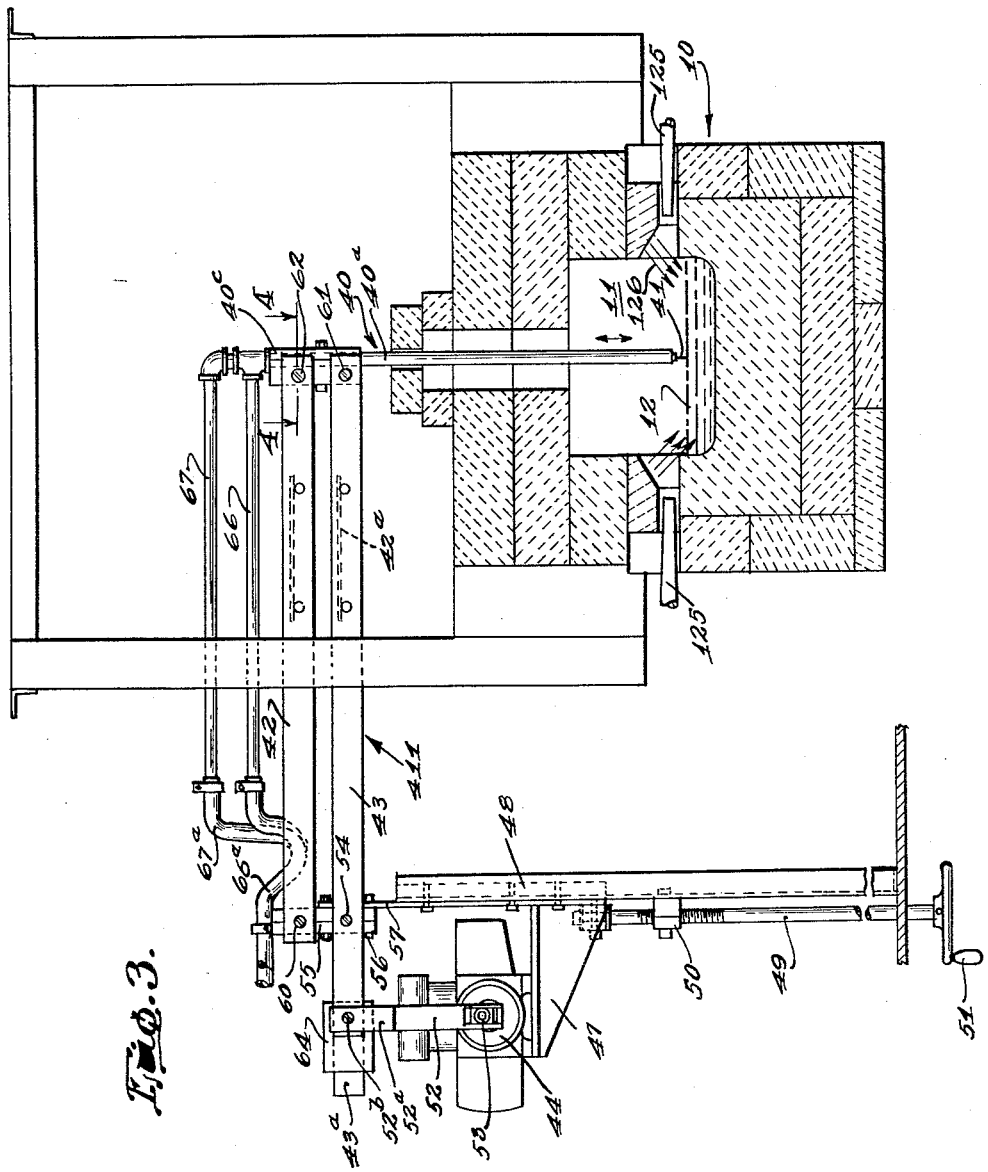

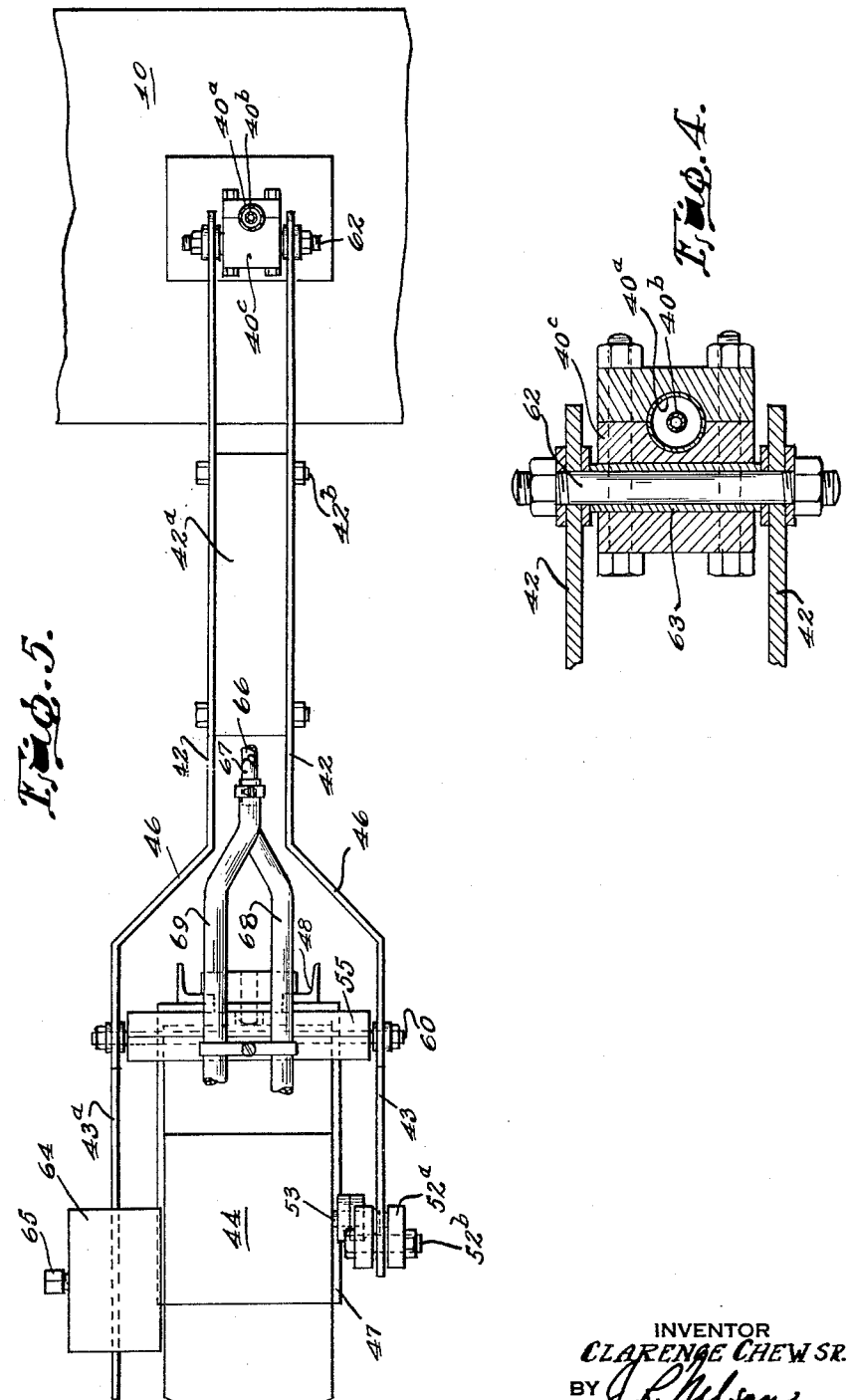

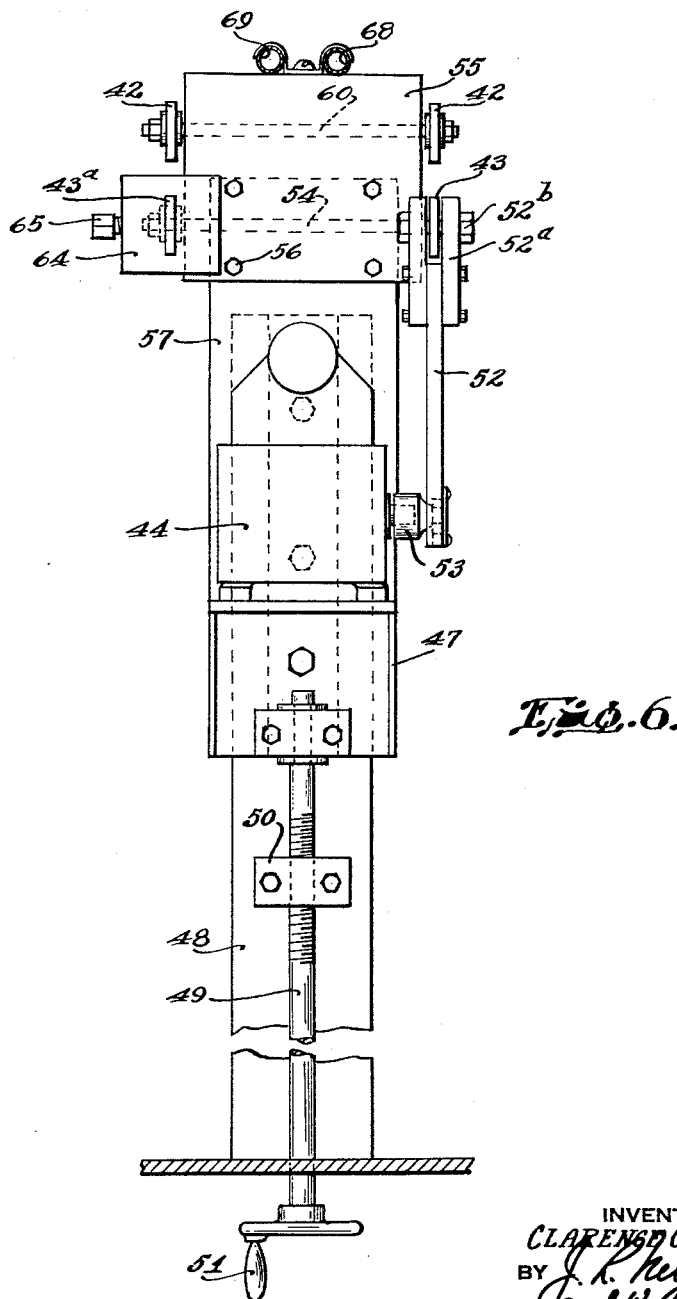

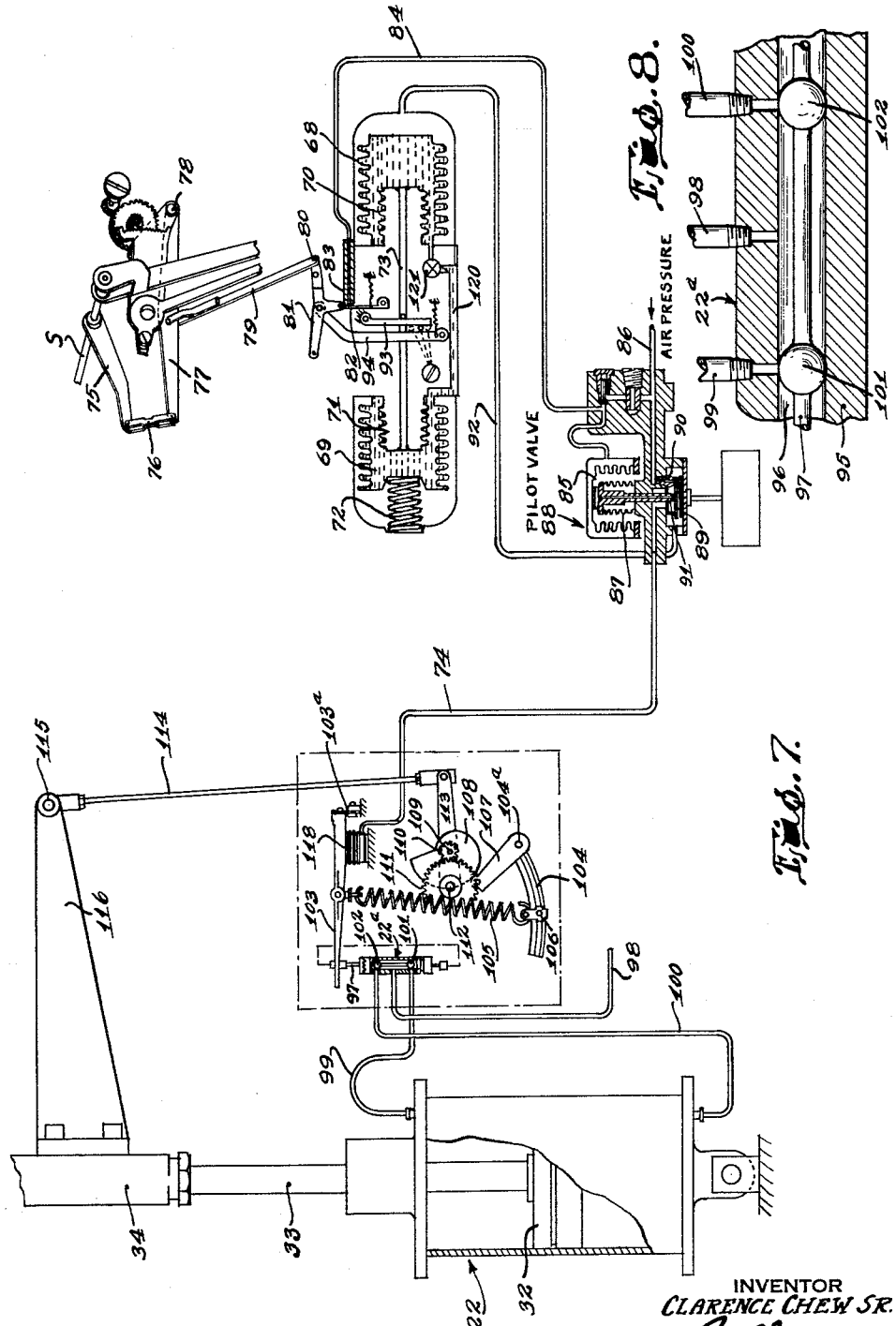

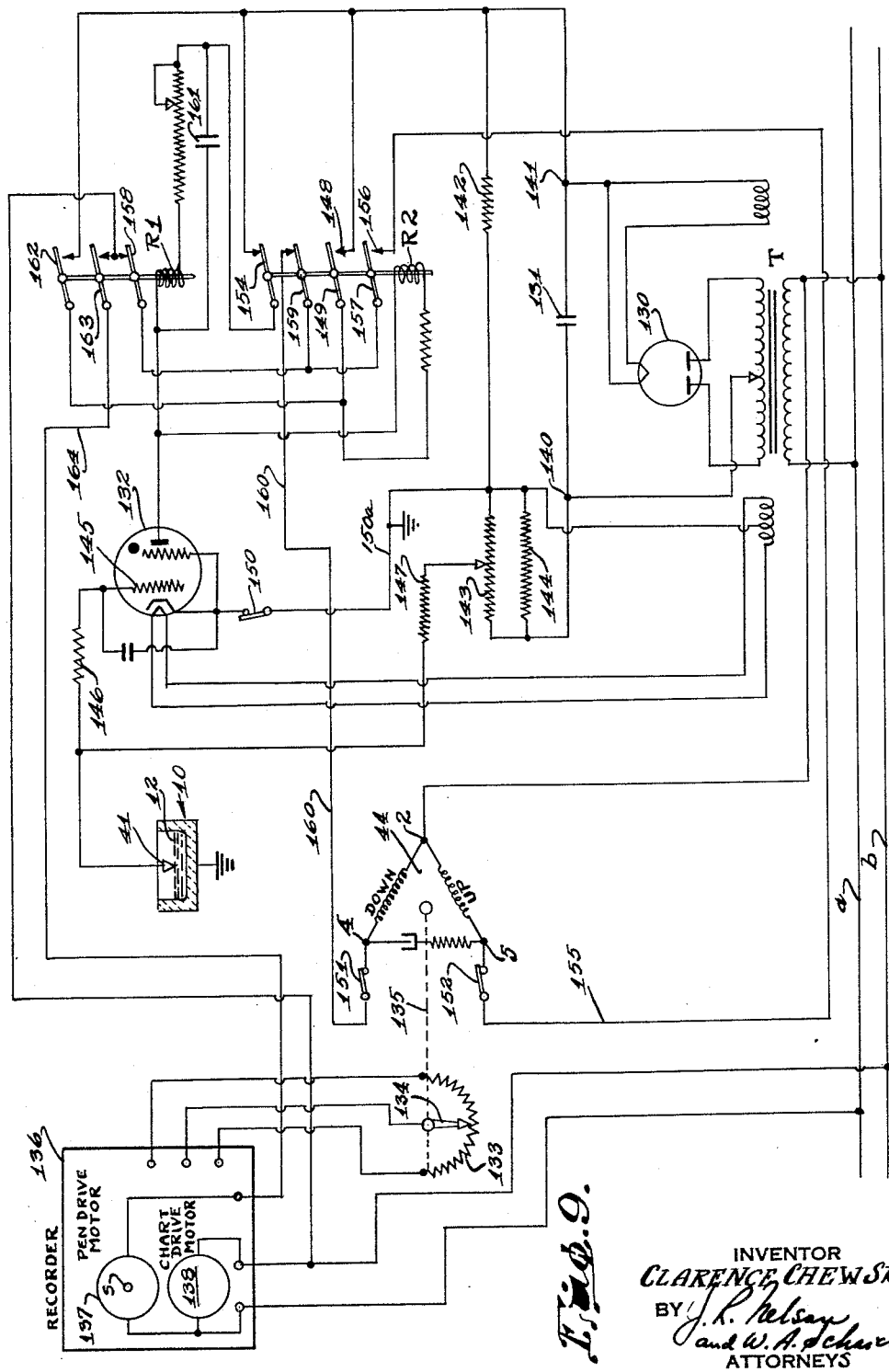

3,053,012
CONTROLLING OPERATION OF A
GLASS FURNACE
Clarence Chew, Sr., Toledo, Ohio, assignor to Owens-Illinois Glass Company, a corporation of Ohio
Original application Nov. 9, 1956, Ser. No. 621,356, now Patent No. 2,999,511, dated Sept. 12, 1961. Divided and this application Dec. 13, 1960, Ser. No. 75,567
4 Claims. (Cl. 49—55)

My invention relates to apparatus for controlling the flow of molten glass from a melting and refining tank through a forehearth and automatically regulating the depth of the flowing glass. In the manufacture of a large variety of glassware it is the usual practice to flow the molten glass from the melting and refining tank through a forehearth channel. At the forward end of the channel the glass is withdrawn in the form of gobs or mold charges. The rate at which the glass is withdrawn depends largely on the size of the articles which are being molded and the forehearth must have a capacity for supplying the molten glass at any desired rate. If the mold charges are large the volume of glass drawn during a given time interval is correspondingly large. As the size of the ware is reduced the ratio of the volume of the glass within the forehearth channel to the actual pull or amount of glass drawn during such time interval, increases rapidly. As a result the rate of flow of the glass throughout the length of the forehearth is greatly reduced. This slow flow of the glass while comparatively small ware is being produced, is objectionable for various reasons. In the first place it results in a condition wherein a large or excessive mass of glass is maintained within the forehearth channel. Consequently any required change in temperature of necessity involves a comparatively long time interval. Further this slow flow of the glass at the required elevated temperatures has a tendency to partially deteriorate the surface layer which eventually finds its way into the gobs or mold charges, resulting in defective ware or an excessive amount of offware. Moreover the slow flow of glass through the channel with a comparatively large cross sectional area of the glass results in an uneven rate of flow throughout such area. That is, the stream or current of glass along the middle of the channel moves faster than the comparatively sluggish portions along the bottom and side walls of the channel. This results in a lack of homogenity of the glass forming the individual mold charges or gobs.

The flow of glass in a comparatively shallow stream is conducive to the maintenance of a substantially constant temperature of the mold charges or glass at the point of withdrawal from the forehearth. Such uniform temperature is of vital necessity in the production of uniform and satisfactory ware. The temperature of glass flowing through a forehearth is commonly controlled by burners and blowers arranged along the side walls of the forehearth for projecting flames or a temperature regulating medium over the surface of the flowing glass. If the body of flowing glass is comparatively deep any required change in temperature is correspondingly slow. By flowing a shallow stream the entire mass of glass is comparatively small and quickly responds to the automatic application of heat or a temperature regulating medium. This prevents any wide variations in the temperature of the glass issuing from the forehearth.

The invention has as one of its objects a means for measuring and maintaining the glass level in the forehearth which includes a probe extending downward to the glass and which is adapted to be lifted and lowered periodically at short intervals by a motor which automatically reverses periodically. The motor is operatively connected to a recording controller. The controller in turn controls the automatic operation of a motor or cylinder operatively connected for lifting and lowering the skimmer block in response to variations in the glass level as indicated by the recording controller.

A further object of the invention is to provide a novel probe and means of actuation to measure and control, as a function of glass level, the operational settings of the forehearth elements.

Other objects of the invention and the precise nature thereof will appear more fully hereinafter in the detailed description of the apparatus as described in connection with the accompanying drawings which illustrate a preferred form of the invention.

Referring to the drawings:

FIG. 1 is a perspective view, partly diagrammatic and with parts broken away, illustrating the forehearth and the means for measuring and controlling the glass level;

FIG. 1A is a section at the line 1A—1A on FIG. 1;

FIG. 2 is an elevational view with the forehearth in cross section, showing the skimmer block and means for lifting and lowering it;

FIG. 3 is a cross sectional view showing the electric probe extending downward into the glass and the motor for reciprocating the probe;

FIG. 4 is a section at the line 4—4 on FIG. 3;

FIG. 5 is a plan view, with parts broken away, of apparatus shown in FIG. 3;

FIG. 6 is an end elevational view of mechanism shown in FIG. 3;

FIG. 7 is a part sectional diagrammatic view showing the motor for lifting and lowering the skimmer block and the means for automatically controlling the operation of the motor;

FIG. 8 is a fragmentary detailed view of a valve shown in FIG. 7; and

FIG. 9 is a wiring diagram of the electrical system.

Referring particularly to FIGS. 1, 2, and 3, the apparatus comprises a horizontally disposed forehearth 10 with a channel 11 through which molten glass 12 flows forwardly from a melting and refining tank to the forward end of the forehearth where the glass is withdrawn or discharged. As shown in FIG. 1 the discharge of glass is under the control of a conventional gob feeder 13. The glass flows through outlet openings in the floor of the furnace and forms gobs or mold charges 14 which are periodically severed by shears 15. The rate of flow and form of the mold charges are automatically controlled as by means including a plunger 16 and a rotating sleeve 17.

The depth of the glass in the forehearth and rate of flow through the forehearth are regulated and controlled by a power driven means, such as a glass depth control block which extends downward between side walls 21 into the channel 11. The skimmer block is approximately the full width of the channel so that substantially all the glass flows beneath the skimmer block, thus operating in conjunction with the gob feeding to control the depth of the glass and its rate of flow. This depth of glass on the downstream side of the block is materialy less than that of the glass on the upstream side.

A drive means for lifting and lowering the skimmer block includes a piston motor 22 (FIGS. 2 and 7). Operating connections between the motor and skimmer block includes a horizontally disposed lever or walking beam 23 pivotally connected at 24 to a standard 25 which may be fixed to the framework 26 of the forehearth. The skimmer block is carried by a pair of gripping jaws 27 connected through a rod 28 to the lever 23. A turnbuckle 29 permits adjustment of the skimmer block relative to the beam 23. Connecting means between the motor 22 to the beam 23 include a sectional rod 30 comprising screw-threaded telescopically connected sections permitting adjustment of the length of the rod. The motor 22 comprises a piston 32 (FIG. 7) and piston rod 33, the latter being connected through a connector block 34 to the rod 30 by a pivot 35.

Referring to FIGS. 3 to 6, a vertically disposed probe 40 extends downwardly through an opening in the roof of the forehearth and carries at its lower end a platinum electrode 41 which makes electrical contact with the glass 12. The probe comprises an outer tube 40a and an inner tube 40b concentric therewith. The probe is clamped in a split clamping block 40c, the sections of which are bolted together. The probe is automatically moved up and down periodically at short intervals by a motor 44 having operating connections with the probe through means including a rocker 411. This rocker comprises an upper pair of bars 42 and a lower pair of bars 43, 43a. The bars of each pair are held in parallel spaced relation by spacing plates 42a to which the bars are clamped by bolts 42b. The bars 42 and 43 include forwardly divergent sections 46 to provide a comparatively wide spacing between the forward ends of the bars. The motor 44 is mounted on a bracket 47 carried on a vertical beam 48. The bracket is mounted for up-and-down adjustment on the beam. Means for adjusting the bracket comprises a vertical shaft 49 screw threaded through a bearing block 50 fixed to the beam 48 and rotatably connected to the bracket 47. The rod 49 is rotatable by a hand crank 51 for adjusting the motor 40 up or down. Connections between the motor 44 and the beam 43 include a connecting rod 52 connected at its lower end to an eccentric or crank 53 on the motor shaft. The upper end of the rod 52 is connected by a yoke 52a and pivot pin 52b to the bar 43. The latter forms a lever fulcrumed on a pivot rod 54. The rod 54 is clamped between plates 55 connected by bolts 56 to a plate 57 integral with the bracket 47. The upper bars 42 are pivotally connected to a rod 60 clamped between the plates 55. The blocks 55 and 40c provided parallel link connections between the upper bars 42 and the lower bars 43, 43a. The latter are connected by a pivot pin 61 to the link 40c. The clamping block 40c carrying the probe 40 is pivotally connected to the bars 42 by a pivot bolt 62 extending through a bearing sleeve 63 (FIG. 4) in the block 40c. It will be seen that with the above described construction the rocker 411 swings about the pivot 54 as a fulcrum, moving the probe up and down, the probe being held vertical during such movements by the parallel link connections. The bar 43a has mounted thereon a counterweight 64 adjustable lengthwise of the bar and held in adjusted position by a clamping bolt 65.

Means for circulating water or other cooling fluid through the probe 40 includes pipes 66 and 67 mounted on the rocker 411 and connected respectively with the outer and inner tubes 40a and 40b of the probe. The cooling fluid is supplied through a flexible hose 66a to the pipe 66 and is discharged through a hose 67a attached to pipe 67.

The temperature of the glass within the forehearth channel is regulated, controlled and maintained substantially constant by means of temperature regulating devices 125 (FIGS. 1, 1A and 3). These include burner pipes through which combustible gases are conducted and by which heating flames 126 are directed over the surface of the glass. These pipes positioned along the sides of the forehearth may be distributed throughout the length of the forehearth. A cooling medium may be supplied through selected pipes 125 where needed for reducing the temperature. The burners may operate automatically under thermostat control. Cover blocks 125a extending over openings in the roof of the forehearth are adjustable to vary the size of the openings and serve as additional temperature regulating and control devices.

With the construction above described, the motor 44, which periodically reverses, oscillates the rocker 411 about its pivot 54 (FIG. 3) and thereby moves the probe up and down periodically. The probe and electrode 41 move downward until the probe 41 makes contact with the glass. The motor 44 controls the operation of the pen driving motor of the recording instrument, as hereinafter described. The motor 44 is stopped momentarily when the probe 41 makes contact with the glass. During this interval the pen driving motor is rotated to move the pen to a position corresponding to the level of the glass which has been sensed by the probe 41. The rotative position of the pen driving motor and its shaft S when the motor 44 is stopped accordingly depends upon the glass level.

The motor 44 is a two winding motor (FIG. 9). When voltage is supplied between the points 2 and 4, the motor drives the probe downward. When the power is applied between the points 2 and 5 the motor drives the probe upward. A down limit switch 151 which is normally closed, is opened by a cam (not shown) when the probe reaches its extreme low position. This is a safety switch and does not enter into the operation when the glass level gauge is working. Its purpose is to deenergize the motor in case the glass level is too low to be reached by the probe or in case of failure of the electronic control unit hereinafter described. An up limit switch 152 is also a normally closed switch which is opened by a cam when the probe reaches its extreme up position. This also is a safety switch and does not enter into the operation when the level gauge is operating. Its purpose is to deenergize the motor in the event that the electronic unit fails to operate when the probe is at the upper end of its stroke.

Referring to the wiring diagram, FIG. 9, the motor 44 receives its power from an alternating current system comprising mains a, b. This may, for example, be a 120 volt, 60 cycle system. Voltage is supplied through a transformer T having its primary connected across the mains a and b. The transformer T together with a full wave rectifier tube 130 and condenser 131, constitutes a conventional full wave filtered power supply furnishing the direct current voltage for operating the rest of the electronic control unit. This unit includes relays R–1 and R–2 and a thyratron 132.

A high-low potentiometer 133 includes a contact arm 134 which has a mechanical driving connection 135 with the motor 44 or the probe operated by said motor. This connection is such that the contact arm 134 is oscillated about its pivot with the oscillating movement of the motor 44 and reaches its limits as the motor reaches its limits during the up-and-down movements of the probe. Thus the motion of the arm 134 has a linear relationship to the motion of the probe.

A recorder 136, which is operated under the control of the motor 44 and potentiometer 133, indicates and records the level of the glass in the forehearth. This recorder may be a null-balancing type of instrument including a reversible pen driving motor 137 and a chart driving motor 138. The motor 138 operates continuously through clock work to rotate the chart on which the record is made by the recording pen driven by the reversible motor 137. The recorder 136 may be an instrument of known construction, and as herein shown diagrammatically and described is a Brown Recording Instrument such as placed on the market by the Brown Instrument Company of Philadelphia.

When the probe electrode 41 is out of contact with the molten glass 12 there is no electric connection between the probe and ground. When the probe is touching the glass there is a very low resistance, on the order of tens of ohms, between the probe and ground. The voltage across a portion of the secondary of the transformer T, namely, between points 140 and 141, is divided between a resistor 142 and the parallel combination of resistors 143 and 144. The voltage across the resistor 142 is available to operate the relays R–1 and R–2 through the thyratron 132 when the latter is allowed to conduct. The voltage across the resistor 143 is available as a negative bias to prevent conduction of the thyratron, the grid 145 of the thyratron being connected through the resistors 146 and 147 to the resistor 143.

The operation of the control system may be described as follows: Beginning at the time the probe electrode 41 has just broken contact with the glass during its upward movement by the motor 44 the electrical action is as follows: The electrode 41 is now isolated from the ground. The voltage across resistor 143 is supplying a negative bias to the thyratron through the resistors 147 and 146. The relay R–2 is energized, having its circuit closed through its contact 148 and contact bar 149, the circuit extending through the thyratron 132 and through an up limit switch 150. This limit switch is opened on the upward stroke on the probe slightly before the latter reaches its extreme limit at which the limit switch 152 would be opened. The relay R–1 is deenergized at this time because its circuit is open at the contact bar 154 of the relay R–2. The motor 44 is driving the probe upward because voltage is being applied between the points 5 and 2 of the motor. This voltage is supplied through a circuit including lead 155, contacts 156, 157 of relay R–2 and closed contact bar 158 of relay R–1.

As the probe approaches the upper limit of its stroke the limit switch 150 automatically opens. This breaks the circuit for the relay R–2 so that the line supplying voltage to the motor 44 at the point 5 is opened at the contacts 156, 157. At the same time the contact bar 159 of relay R–2 completes a circuit through the lead 160 to the point 4 of the motor. The motor is thus reversed and drives the probe downward. This causes the limit switch 150 to reclose, but the negative bias on the thyratron 132 keeps the thyratron from conducting so that neither of the relays R–1, R–2 is energized.

When the probe during its downward movement contacts the hot glass the negative bias applied to the thyratron is reduced greatly because the resistance between the probe and ground is now much lower than that of the resistor 147. The thyratron now conducts and energizes the relay R–1 and charges the condenser 161. When the relay R–1 operates, its contact bar 162 completes a circuit for the relay R–2 which then operates so that the contact bar 154 of R–2 opens the circuit of the relay R–1. However the charge on the condenser 161 keeps relay R–1 closed for a brief time, approximately one second. When this charge is dissipated, the relay R–1 is deenergized. The relay R–2 remains energized through its own holding contacts 149, 148.

During the short time that the circuit for relay R–1 remains closed, the motor 44 is stopped because the circuit is opened at the contact bar 158 of the relay R–1, and the pen drive motor 137 in the recorder is energized, its circuit being established through a contact bar 163, the circuit being completed through a lead 164. Accordingly during this time the recorder pen moves to a position correspondingly to the position of the contact arm 134 of the potentiometer. Thus the pen drive motor 137 and its shaft S are rotated to a position corresponding to the level of the glass at the probe tip 41. When the relay R–1 opens, the cycle begins to repeat.

Referring to FIG. 7, the automatic means by which the position and rotative movements of the pen drive motor shaft S control the operation of the piston motor 22, includes an air line control mechanism of known construction, placed on the market by the Brown Instrument Company of Philadelphia. Such control mechanism includes bellows 68 and 69 filled with an operating liquid and smaller air bellows 70 and 71 within the larger bellows 68 and 69. A rod 73 connects the inner bellows 70, 71. A counter-balance spring 72 bears against the bellows 69. The control mechanism also includes a pilot valve 88. Air pressure supplied through said control mechanism is transmitted through a pipe 74 to means for controlling the operation of a motor control valve 22a for the piston motor 22.

A rock arm 75 on the shaft S is connected through a link 76 to a lever 77 fulcrumed at 78. A link 79 connects the lever 77 to a flapper-actuating lever 81 connected to a flapper 82. The flapper bears against a nozzle 83 which communicates through a pipe 84 with a pilot valve 88. The pilot valve includes a smaller bellows 87 within a larger bellows 85. Controlled air pressure is supplied to the pilot valve through a pressure pipe 86 which extends to a nozzle 90. A pilot relay flapper 89 covers the nozzle 90 and the exhaust port through the nozzle 91 of the bellows 87.

Any rotative movement of the shaft S is transmitted through the rock arm 75, link 76, lever 77, and link 79 to rock the flapper actuating lever 81 which bears against the nozzle 83. This results in a change in the back pressure transmitted through the pipe 84 to the larger bellows of the pilot valve. This is opposed to the pressure supplied through the air pressure pipe 86 to the inner bellows. When the forces on the bellows 85 and 87 are balanced the flapper 89 covers both the supply port or nozzle 90 and the exhaust port 91. With an increase in the back pressure from the nozzle 83 the larger pilot bellows 85 moves forward, carrying the exhaust nozzle 91 which pushes against the pilot relay flapper 89 thereby keeping the exhaust port 91 closed and opening the supply port at nozzle 90. With a decrease in the back pressure from the nozzle 83 the larger pilot bellows 85 is retracted and thereby opens the exhaust port 91 and also permits the flapper 89 to close the supply port at nozzle 90.

Any change or pressure in the pilot relay 88 is transmitted through a pipe 92 to the larger bellows in the control unit. This change of air pressure is transmitted through the liquid in the bellows to the inner bellows connected by the horizontal rod 73. This movement of the connecting rod is transmitted through an adjustable lever system, comprising levers 93, 94, to the flapper 82.

The flapper is thereby moved in a direction opposite to the movement originally produced, as above described, by the rotation of the flapper-actuating lever 81.

The movement of the flapper 82 resulting from the movement of the connecting rod 73 is just enough to stabilize the air pressure at a new value. This change in the air pressure is proportional to the extent of the rotative movement of the shaft S by which such change has been produced.

The valve 22a controlling the operation of the motor 22 comprises a valve casing 95 (see FIG. 8) with a central bore 96. Extending lengthwise through said bore is a valve rod 97. Air pressure for operating the motor is supplied through a pressure pipe 98 and is transmitted through pipes 99 and 100 to the upper and lower ends respectively of the motor cylinder. When the valve rod 97 is in central or neutral position, valve balls 101 and 102 cover ports opening to the pipes 99 and 100 respectively so that the motor piston is held at rest. If the valve rod 97 is moved upwardly the pipe 100 is opened to the pressure pipe 98 and the pipe 99 at the same time is opened to exhaust through the channel 96 so that the motor piston 32 is moved upwardly and operates to lower the skimmer block 20. When the valve rod 97 is moved downwardly from its neutral position, the pressure line is connected through the valve to the pipe 99 for lowering the motor piston 32 and raising the skimmer block.

The means for automatically operating the valve 22a is under the control of the air pressure supply through the pipe 74. The valve rod 97 is connected to the free end of a lever 103 mounted to swing about a fulcrum point 103a. A coil tension spring 105 connects the lever 103 with a rock arm 104 attached to a rock shaft 104a. Connecting means 106 for the spring 105 permits adjustment of the connecting point lengthwise of the rock arm 104.

A rock arm 107 fixed to the rock shaft 104a carries a cam follower roll running on a cam 108. The cam is keyed to a rock shaft 109 to which is also fixed a gear pinion 110 running in mesh with a gear 111 fixed to a rock shaft 112. A rock arm 113 fixed to the shaft 112 is connected to a rod 114 extending upwardly therefrom. The rod 114 is connected by a pivot 115 to an arm 116 bolted to the block 34 (FIGS. 2 and 7).

The air pressure supplied through the pipe 74 is applied to a bellows 118 which applies upward pressure to the lever 103 opposing the downward pull of the tension spring 105. The lever 103 and therefore the position of the pilot valve rod 97 is stabilized when the opposing forces of the bellows and the spring are balanced. An increase in the pressure supplied through pipe 74 operates through the bellows and the lever 103 to move the valve stem upward, thereby opening the pipe 100 to pressure and causing an upward movement of the motor piston 32. This upward movement of the motor piston operates through the arm 116, link 114, and gear train 111, 110 to rotate the cam 108 in a clockwise direction. This permits the arm 104 to swing upwardly, thereby decreasing the tension on the spring 105. Counterbalancing the increased pressure in the bellows 118 thus requires an upward movement of the lever 103 and valve stem 97.

Automatic resetting of the rock shaft S after the latter has operated as above described is effected as follows: The liquid fills in the larger bellows 68 and 69 and are connected through a channel 120 in which is a dial 121 which automatically restricts the passage 120. The smaller bellows 70, 71 are spring loaded by the spring 72 so that they will return to the normal position when the liquid pressures in the two larger bellows have been equalized by the flow of liquid through the channel 120. The rate of this flow depends upon the size of the restriction which is adjusted by the dial 121. As these pressures are equalized and the connector rod 73 moves toward its normal position, the position of the flapper 82 is again changed with respect to the nozzle 83. This change causes a further change in the controlled air pressure in the same direction as the initial change heretofore described. This second corrective action therefore tends to return the rock shaft and is maintained only as long as there is a deviation of the rock shaft S from its normal position. Through the second corrective action the controlled air pressure has been changed to a new value.

This application is a divisional of copending application Serial No. 621,356, filed November 9, 1956, now Patent No. 2,999,511.

Modifications may be resorted to within the spirit and scope of my invention as defined in the appended claims.

I claim:

1. The combination of means providing a horizontally disposed channel through which an electrically conducting fluid is caused to flow, a probe comprising concentric tubes, a rocker mounted above the channel and to which said probe is attached in position to extend substantially vertically downward over and into the channel, an electrode at the lower end of the probe in position to contact the fluid in the channel, means for circulating a cooling medium through said tubes, said rocker mounted for rocking movement about a horizontal axis, a reversible electric motor comprising an oscillating shaft and crank, means for driving the motor, and means comprising a link connecting said crank to the said rocker and providing a driving connection from the motor to said rocker by which the latter is rocked and by which the electrode is periodically moved into and out of contact with the glass.

2. The combination of a furnace forehearth comprising a channel through which molten glass is caused to flow, a probe comprising concentric tubes, a rocker to which said probe is attached in position to extend substantially vertically downward over the channel, an electrode at the lower end of the probe in position to contact the glass in the channel, means for circulating a cooling medium through said tubes, said rocker mounted for rocking movement about a horizontal axis, a reversible electric motor, means for driving the motor, and means providing a driving connection from the motor to said rocker by which the latter is rocked and by which the electrode is periodically moved into and out of contact with the glass.

3. The combination of a furnace forehearth through which molten glass is caused to flow, a probe extending downward over the glass in the forehearth, said probe including an electrode, a reciprocating electric motor, means providing operating connections between the motor and probe for moving the latter up and down and thereby moving the electrode out of and into contact with the flowing glass, a drive means, electro-responsive control means controlling the operation of said electric motor and including a control circuit comprising said electrode and the molten glass, said control means being operative to arrest the said motor when the probe makes contact with the glass, thereby stopping the motor in a position determined by the glass level when the electrode makes contact with the glass, and automatic means brought into operation when the motor is stopped for effecting operation of said drive means and bringing it to a position corresponding to the position at which the motor is arrested.

4. A glass level measuring and controlling mechanism comprising a probe including an electrode, a reciprocating electric motor, means providing operating connections between the motor and probe for moving the latter up and down and thereby moving the electrode out of and into contact with a body of molten glass, electro-responsive control means controlling the operation of said electric motor and including a control circuit comprising said electrode and molten glass, said control means being operative to arrest the said motor when the probe makes contact with said glass, thereby stopping the motor in a position determined by the glass level in said body of glass when the electrode makes contact with said glass, and automatic means brought into operation when the motor is stopped for controlling the glass level of said glass body in a manner corresponding to the position at which the motor is arrested.

References Cited in the file of this patent

UNITED STATES PATENTS

| | | |
|---|---|---|
| 1,878,598 | Pieler | Sept. 20, 1932 |
| 2,565,136 | Kretzer | Aug. 21, 1951 |